(12) United States Patent
Sechrist

(10) Patent No.: US 6,784,132 B1
(45) Date of Patent: Aug. 31, 2004

(54) CYCLIC CATALYST REGENERATION PROCESS USING ADSORPTION AND DESORPTION

(75) Inventor: Paul A. Sechrist, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 201 days.

(21) Appl. No.: 10/010,564

(22) Filed: Nov. 5, 2001

(51) Int. Cl.[7] .......................... B01J 38/44; B01J 38/42; B01J 38/18; B01J 38/14; C01G 51/00

(52) U.S. Cl. .............................. 502/37; 502/35; 502/50; 502/52; 502/53; 208/140

(58) Field of Search .................... 502/35, 50, 37, 502/53; 208/140

(56) References Cited

U.S. PATENT DOCUMENTS

| | | | | |
|---|---|---|---|---|
| 4,406,775 A | * | 9/1983 | Bailor et al. | 208/140 |
| 4,447,551 A | * | 5/1984 | Fung et al. | 502/37 |
| 4,662,081 A | * | 5/1987 | Greenwood | 34/443 |
| 5,151,392 A | * | 9/1992 | Fettis et al. | 502/37 |
| 5,336,834 A | * | 8/1994 | Zarchy et al. | 585/737 |
| 5,965,473 A | | 10/1999 | Sechrist et al. | 502/35 |
| 6,117,809 A | | 9/2000 | Sechrist et al. | 502/35 |

* cited by examiner

Primary Examiner—Stanley S. Silverman
Assistant Examiner—Jonas N. Strickland
(74) Attorney, Agent, or Firm—John G. Tolomei; Michael A. Moore

(57) ABSTRACT

A method of recovering halogen-containing materials from the cyclic catalyst regeneration operation of a catalytic hydrocarbon conversion process is disclosed. The method uses an arrangement of beds of adsorbent to maintain the halogen-containing materials within a circulating regeneration circuit.

22 Claims, 1 Drawing Sheet

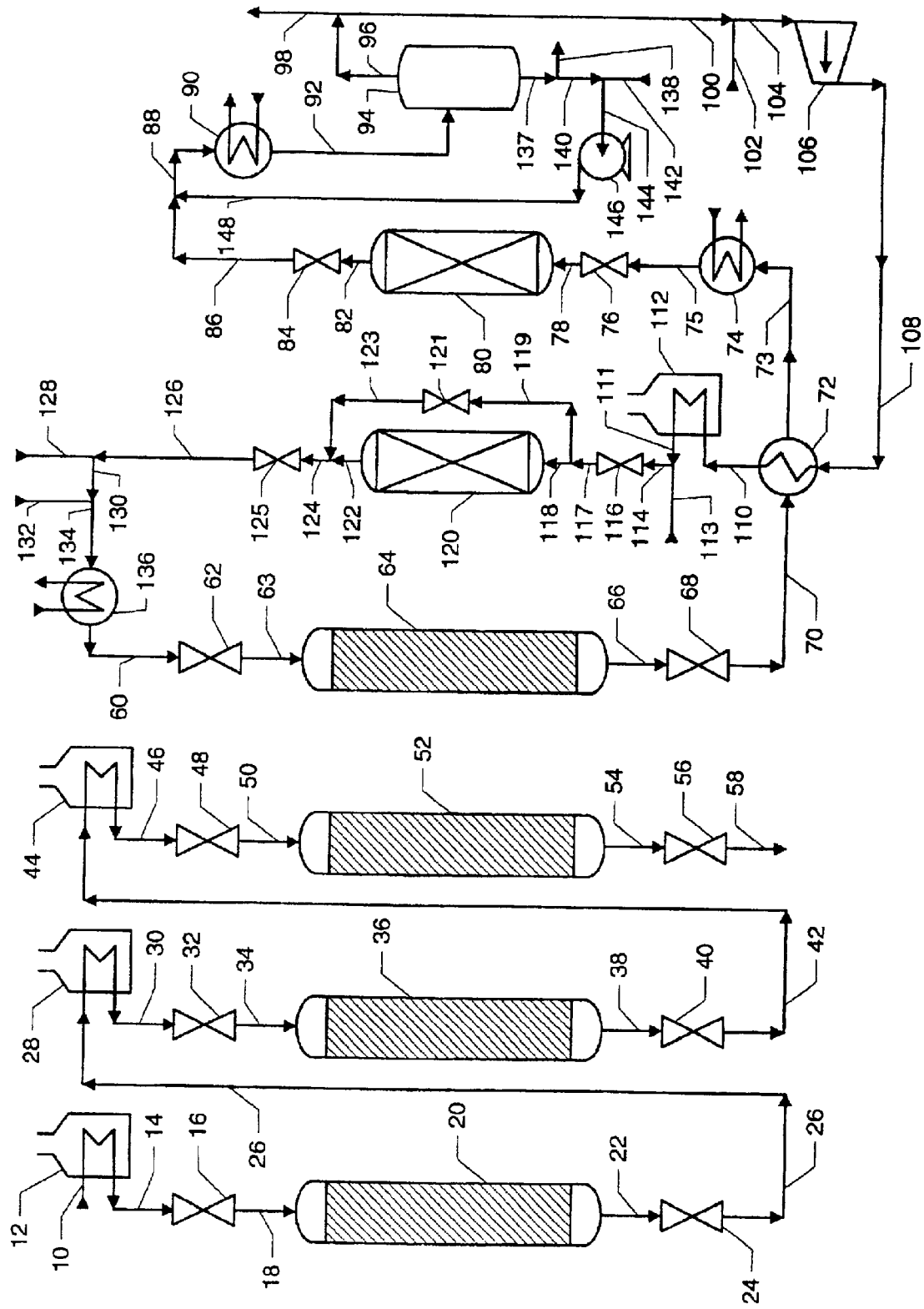

CYCLIC CATALYST REGENERATION PROCESS USING ADSORPTION AND DESORPTION

FIELD OF THE INVENTION

This invention relates generally to the regeneration of hydrocarbon conversion catalysts in the presence of a halogen-containing material.

BACKGROUND OF THE INVENTION

Numerous hydrocarbon conversion processes are widely used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others.

Many such processes use catalysts to promote hydrocarbon conversion reactions. These catalysts tend to deactivate for a variety of reasons, including the deposition of carbonaceous material or coke upon the catalyst, sintering or agglomeration or poisoning of catalytic metals on the catalyst, and/or loss of catalytic metal promoters such as halogens. Consequently, these catalysts are typically reactivated in a process called regeneration. Reactivation can thus include, for example, removing coke from the catalyst by burning, redispersing catalytic metals such as platinum on the catalyst, oxidizing such catalytic metals, reducing such catalytic metals, replenishing catalytic promoters such as chloride on the catalyst, and drying the catalyst.

One of the problems during regeneration of halogen-containing catalysts is loss of halogen itself from the catalyst. This happens when the catalysts are contacted with gases that, while regenerating the catalyst, tend also to remove halogen from the catalyst.

U.S. Pat. No. 5,965,473 discloses a method for recovering chlorine-containing materials from the effluent gases during catalyst regeneration in a hydrocarbon conversion process with a cyclic regeneration operation. To prevent loss of chlorine-containing materials, U.S. Pat. No. 5,965,473 uses one of the off-stream catalyst beds. This is an inefficient use of the vessel that contains the off-stream catalyst bed as well as of the catalyst itself, both of which could be better used for promoting hydrocarbon conversion reactions. Therefore, more efficient methods are sought to decrease the loss of halogen during halogen-containing catalyst regeneration.

SUMMARY OF THE INVENTION

This invention is a catalyst regeneration process that uses a bed of adsorbent first to adsorb halogen-containing materials that are removed from catalyst undergoing regeneration, and then to desorb these halogen-containing materials so they are readsorbed on to catalyst that is undergoing regeneration. The bed of adsorbent, therefore, is contacted with streams and at conditions that are different from those used during hydrocarbon conversion. This invention does not use a reaction vessel and its catalyst to adsorb and desorb the halogen-containing materials.

One object of this invention is to improve processes for regeneration of hydrocarbon conversion halogen-containing catalysts. Another object is to recover halogen-containing materials that are present during catalyst regeneration. A third object is to improve the utilization of equipment and catalysts used in hydrocarbon conversion processes, including reforming, isomerization, and dehydrogenation. A fourth object is to improve the efficiency of cyclic catalyst regeneration processes.

In a broad embodiment, this invention is a process for the regeneration of a hydrocarbon conversion catalyst in the presence of a halogen-containing material. The process comprises contacting a regeneration inlet stream comprising a first component selected from the group consisting of oxygen, hydrogen, nitrogen, and a $C_1$–$C_5$ hydrocarbon with a catalyst in the presence of a halogen-containing material at regeneration conditions to at least partially regenerate the catalyst and produce a regeneration effluent stream comprising the material and the first component; contacting at least a portion of the regeneration effluent stream with an adsorbent, adsorbing the material on the adsorbent at adsorption conditions, and recovering an adsorption effluent stream comprising the first component and having a reduced concentration of the material relative to the at least a portion of the regeneration effluent stream; contacting a desorption inlet stream comprising a second component selected from the group consisting of oxygen, hydrogen, nitrogen, and a $C_1$–$C_5$ hydrocarbon with the adsorbent, the adsorbent having the material adsorbed thereon, desorbing the material from the adsorbent at desorption conditions, and recovering a desorption effluent stream comprising the material and the second component; and forming the regeneration inlet stream from at least a portion of the desorption effluent stream.

Other embodiments and objects are described in the detailed description of the invention.

INFORMATION DISCLOSURE

U.S. Pat. No. 5,336,834 (Zarchy et al.) discloses an adsorption zone in combination with a catalytic hydrocarbon conversion process that keeps chlorine-containing compounds in the catalyst bed and prevents contamination of product streams with chlorine-containing compounds. The contents of U.S. Pat. No. 5,336,834 are hereby incorporated herein by reference.

U.S. Pat. No. 5,965,473 (Sechrist et al.) discloses a method for recovering chlorine-containing materials from the effluent gases during catalyst regeneration in a hydrocarbon conversion process with a cyclic regeneration operation. The contents of U.S. Pat. No. 5,965,473 are hereby incorporated herein by reference.

U.S. Pat. No. 6,117,809 (Sechrist et al.) discloses a method for recovering chlorine-containing materials removed from a chloride-containing catalyst undergoing reduction by using a sorption zone which contains catalyst. The contents of U.S. Pat. No. 6,117,809 are hereby incorporated herein by reference.

BRIEF DESCRIPTION OF THE DRAWING

The drawing is a process flow diagram showing an embodiment of the invention.

DETAILED DESCRIPTION OF THE INVENTION

This invention recovers halogen-containing materials especially chlorine-containing materials removed from hydrocarbon conversion catalysts undergoing cyclic catalyst regeneration. These materials, which are present in the regeneration effluent, are absorbed on an adsorbent contained in at least one adsorption bed. Once the adsorption bed has adsorbed the halogen-containing material, the halogen-containing materials are desorbed from the bed. Desorption takes place using a stream that is then used to regenerate the catalyst. When this regenerant stream contacts catalyst that is undergoing regeneration, it thus returns the halogen-containing materials to catalyst.

This invention uses at least one adsorbent. The adsorbent reversibly adsorbs at least one halogen-containing material. Suitable adsorbents include molecular sieves such as zeolites, clays, inorganic polymers such as alumina and activated alumina, zirconia, carbon, activated carbon, organic polymers such as resin adsorbent, etc. Suitable aluminas include gamma, alpha, theta, etc. Suitable adsorbents also include the ion exchanged clinoptilolites described in U.S. Pat. No. 5,336,834. Preferably, the adsorbent is selected so that the conditions at which the adsorbent has a capacity for reversible adsorption correspond to the conditions for cyclic regeneration. In addition, the adsorbent's select physical properties that affect reversible adsorption preferably do not degrade significantly when the adsorbent is used for adsorption and desorption. For example, while adsorbents with high surface areas are preferred, it is also preferred that the repeated use of the adsorbent for adsorption and desorption does not significantly decrease the adsorbent's surface area. Thus, while silica gel may be used as the adsorbent, it is not preferred. Although the adsorbent may contain an IUPAC Group 8–10 (VIII A) or noble metal component such as gold, silver, platinum, palladium iridium, rhodium, mercury, ruthenium, or osmium, the adsorbent contains preferably less than 0.1 wt-%, and more preferably none, of the metal, based on the weight of the adsorbent. More than one adsorbent may be used. Multiple adsorbents may be combined into a composite material, or they may be used without compositing, such as in a physical admixture of two adsorbents.

In addition to reversibly adsorbing at least one halogen-containing material, the adsorbent may also reversibly adsorb water. Generally, water is present along with the halogen-containing material in the cyclic regeneration stream from which the halogen-containing material is recovered. Generally, the conditions that result in reversible adsorption of the halogen-containing material also result in reversible adsorption of water. However, the presence of water can affect, sometimes adversely, the adsorption of the halogen-containing material, because water can compete with the halogen-containing material for sites on the adsorbent.

This invention is believed to be applicable to a wide range of catalytic hydrocarbon conversion processes and the regeneration of their catalysts, including aromatic isomerization, paraffin or olefin isomerization, paraffin dehydrogenation, and alkylation. However, catalytic reforming is the most widely practiced hydrocarbon conversion process which uses cyclic catalyst regeneration and to which this invention applies. Reforming catalysts typically contain a halogen, such as chlorine. Catalytic reforming is described in U.S. Pat. No. 5,965,473, the contents of which are hereby incorporated herein by reference.

This invention is applicable to many of the individual regeneration steps that typically comprise a cyclic regeneration operation of a catalytic reforming process. These include coke combustion, redispersion of catalytic metal on the catalyst, rehalogenating of the catalyst, drying of the catalyst, and reduction of catalytic metal on the catalyst. Except for drying, these steps are described in U.S. Pat. No. 5,965,473. Drying can occur by contacting the catalyst with a gas containing oxygen, hydrogen, nitrogen, or a $C_1$–$C_5$ hydrocarbon, or a mixture thereof, under conditions such that water is transferred from the catalyst to the gas. Preferably the gas does not react with the catalyst, any component thereof, or any deposit thereon. Drying conditions usually comprise an elevated temperature and/or a reduced pressure and/or an elevated gas hourly space velocity, including the temperatures, pressures, and gas hourly space described for the other regeneration steps in U.S. Pat. No. 5,965,473. Usually the water-containing effluent from the drying step is itself dried and then recycled to the catalyst bed to further dry the catalyst. Drying of the effluent usually takes place first by cooling the gas and then condensing the water and/or by contacting the gas with a desiccant. When drying involves cooling the gas, the gas is normally reheated prior to recycling.

The drawing shows a cyclic reforming process using three on-stream reactors 20, 36, and 52, and a fourth off-stream reactor 64 which is undergoing regeneration. Only the equipment and lines necessary for an understanding of the invention are shown in the drawing. The reactors have inlet lines 18, 34, 50, and 63 containing valves 16, 32, 48, and 62, which can be opened or closed to start or stop flow to each reactor. They also have outlet lines 22, 38, 54, and 66 containing valves 24, 40, 56, and 68, which can be opened or closed to start or stop flow from each reactor. Well-known equipment and lines (not shown) connect the reactors to each other so that each on-stream reactor can be taken off-stream and regenerated in the place of off-stream reactor 64, and so that the off-stream reactor 64 can be placed on-stream and function as any of the on-stream reactors. Although this description is mainly in terms of three on-stream reactors and one off-stream reactor, there may of course be more or fewer on-stream reactors or off-stream reactors, and some off-stream reactors may have already undergone regeneration, while others may be awaiting regeneration.

A combined feed stream comprising naphtha and hydrogen flows through line 10, is heated in heater 12, passes through line 14, valve 16, and line 18, and enters reactor 20, where reforming reactions occur. Reactor 20 effluent flows through line 22, valve 24, and line 26. Since reforming reactions are generally endothermic the effluent is heated in heater 28, and the heated effluent flows through line 30, valve 32, to and line 34, and into reactor 36. Effluent from reactor 36 flows through line 38, valve 40, and line 42, is heated in heater 44, flows through lines 46, valve 48, and line 50, and enters reactor 52. Reactor 52 effluent flows through line 54, valve 56, and line 58 to conventional product separation and recovery facilities (not shown).

The catalyst in off-stream reactor 64 is undergoing regeneration using a recirculating regeneration system that uses two beds containing adsorbent, 80 and 120. Adsorbent bed 80 operates in adsorption mode and adsorbent bed 120 operates in desorption mode. Adsorption bed 80 has inlet line 78 containing valve 76, which can be opened or closed to start or stop flow to the bed. Adsorption bed 80 also has outlet line 82 containing valve 84, which can be opened or closed to start or stop flow from the bed. Desorption bed 120 has an inlet line 118, another inlet line 117 upstream which contains inlet valve 116, an outlet line 122, and another outlet line 124 downstream which contains valve 125. Desorption bed 120 also has bypass lines 119 and 123 and bypass valve 121, which can be opened or closed to start or stop bypass flow around desorption bed 120. Well-known equipment and lines (not shown) connect the beds to each other so that the bed 80 in adsorption mode can be placed in desorption mode, and so that bed 120 in desorption mode can be placed in adsorption mode.

The following description is mainly in terms of the regeneration step being coke combustion, but this is not intended to limit the scope of this invention as set forth in the claims. Regenerant gas (also referred to herein as combustion gas) comprising oxygen, nitrogen, and a halogen-containing material (hydrogen chloride or chlorine) flows at an elevated temperature through line 60, valve 62, and line 63, and enters reactor 64. Since the combustion of coke deposits on the catalyst in reactor 64 is generally exothermic, the reactor 64 effluent gas (also referred to herein as flue gas) is hotter than the combustion gas. More importantly for this invention, the flue gas contains one or more halogen-containing materials that have been removed from the catalyst by the coke combustion, usually because of the combined effect of gas contacting, heat release, and any water produced. The flue gas flows through line 66, valve 68, and line 70, and enters heat exchanger 72, which cools the flue gas by indirectly transferring heat to the gas stream flowing through line 108. The cooled flue gas flows through line 73 to cooler 74. Cooler 74 further cools the gas stream by indirect heat exchange to the desired inlet temperature for adsorption, using water or air as a cooling medium. The further cooled gas stream flows through line 75, valve 76, and line 78, and enters bed 80, which contains alumina adsorbent. Adsorbent bed 80 is operating in adsorption mode, and the adsorbent adsorbs at least some of the halogen-containing material from the cooled flue gas.

The adsorption effluent flows through line 82, valve 84, and line 86, and mixes with a liquid aqueous caustic solution (e.g., aqueous sodium hydroxide) flowing in line 148. The caustic solution neutralizes halogen-containing materials still present in the adsorption effluent and helps protect downstream equipment (e.g., cooler 90 and separator 94) from corrosion. The two-phase mixture of cooled flue gas and aqueous caustic solution flows through line 88 to cooler 90. Cooler 90 cools the mixture to ambient temperature, using water or air as a cooling medium. Cooler 90 effluent flows through line 92 to vapor-liquid separator 94. Separator 94 may be empty or it may contain devices such as mesh blankets or baffles that help separate the vapor and liquid phases. The liquid that collects in the bottom of separator 94 and exits through line 137 is primarily aqueous caustic solution containing salts from neutralizing the halogen-containing materials. To prevent salts from accumulating in the recirculating caustic solution, a minor portion of the liquid in line 137 is withdrawn from the process through line 138 and routed to conventional spent caustic recovery facilities (not shown). The remaining portion of the liquid flows through line 140 and combines with a make-up stream of fresh caustic entering in line 142. Line 144 carries this caustic solution to pump 146, which discharges into line 148.

A gas stream from separator 94 flows through line 96. Since this stream contains carbon dioxide byproduct from coke combustion, a minor portion of these vapors is vented from the process through a line 98. The remaining portion of these vapors flows through line 100 and combines with an oxygen-containing make-up stream (usually air) in line 102. Line 104 carries this gas stream to compressor 106, which discharges into line 108. The gases in line 108 are heated by indirect heat transfer in exchanger 72, flow through line 110, and are further heated to the desired inlet temperature for desorption in heater 112. After heating, the gases flow through line 111 and combines with a make-up stream (if any) in line 113. The make-up stream can be used to add water (or a compound that forms water) to the gases in order to help halogen desorption. The gases flowing in line 114 flows through valve 116, line 117, and line 118, and enter bed 120, which contains alumina adsorbent containing halogen-containing materials. Bed 120 operates in desorption mode, and halogen-containing materials on the alumina adsorbent are desorbed and exit with the effluent of adsorption bed 120. When desired, a portion of the gases flowing through line 117 may be made to bypass desorption bed 120 through lines 119 and 123, provided that bypass valve 121 is open.

The desorption effluent flows through line 122 combines with any bypass flow in line 123, and flows through line 124, valve 125, and line 126, and combines with a make-up stream (if any) in line 128. The make-up stream can be used to add additional halogen to the stream flowing in line 126 to produce the gas stream flowing in line 130. Averaged over time, the amount of halogen added through line 128 is approximately equal to the amount of halogen neutralized by the contact of the caustic solution flowing in line 148 with the gases flowing in line 86. But at any particular point in time, the amount of halogen added through line 128 is usually what is needed to attain the desired molar ratio of water to halogen at the inlet of the off-stream reactor 64 for regeneration purposes.

The gas flowing in line 130 combines with another make-up stream (if any) in line 132. The make-up stream in line 132 can be used to add additional water (or a compound that forms water after being added, such as an alcohol) to the stream flowing in line 130 to produce the combustion gas (regeneration gas) flowing in line 134. The amount of water (or compound that forms water) added through line 132 is usually what is needed to attain the desired molar ratio of water to halogen at the inlet of the off-stream reactor 64 for regeneration purposes. As a final step prior to entering the off-stream reactor 64, the combustion gas may be cooled, or possibly even heated if necessary, using exchanger 136 to achieve the desired inlet temperature for off-stream reactor 64. Whether or not exchanger 136 is needed depends on the outlet temperature of desorption bed 120 and the inlet temperature of off-stream reactor 64.

Prior to being placed in adsorption mode, the bed of adsorbent 80 had operated in desorption mode in the position of bed of adsorbent 120. While the bed 80 was in desorption mode, the halogen-containing materials on the alumina adsorbent were desorbed and passed to the off-stream reactor that was undergoing regeneration at the time. This desorption depleted the alumina adsorbent in bed 80 of halogen-containing materials, and thereby prepared the alumina adsorbent in bed 80 for use in adsorption mode. Conversely, prior to being placed in desorption mode the bed 120 had operated in adsorption mode in the position of bed 80. While the bed 120 was in adsorption mode, the halogen-containing materials from the off-stream reactor that was undergoing regeneration at the time were adsorbed on the alumina adsorbent. This adsorption added halogen-containing materials to the alumina adsorbent in bed 120, and thereby prepared the alumina adsorbent in bed 120 for use in desorption mode.

The operating conditions for the process of this invention are determined by many factors, but a primary factor is the regeneration conditions of the off-stream reactor. The regeneration conditions for the off-stream reactor 64 usually include an inlet temperature, an inlet gas hourly space velocity, an inlet oxygen concentration, and an inlet molar ratio of water to halogen of the combustion gases flowing in line 63, a peak or maximum temperature of the catalyst bed in off-stream reactor 64, and an outlet temperature of the flue gases flowing in line 66. In practice, when the halogen is chlorine the molar ratio of water to halogen is the molar ratio of water to chloride. Of course, the specific target values of each of these regeneration variables depends on the composition and nature of the catalyst being regenerated, on the process and mechanical details of the off-stream reactor 64 and other associated equipment (such as exchangers 136 and 72), and on the regeneration step that is actually taking place. A person of ordinary skill in the art is able to determine the values of these regeneration variables.

In a first embodiment, the desired inlet conditions of off-stream reactor 64 are the same, or substantially the same, as the outlet conditions of desorption bed 120. In that case, the bypass valve 121 would be closed, and there would be neither halogen addition through line 128, nor water addition through line 132, nor heat exchange by heat exchanger 136. For example, when there is no heat transfer between the desorption bed and the off-stream reactor, then the desorption outlet temperature is about the same as the regeneration inlet temperature. To achieve those outlet conditions for the desorption bed 120 without undue experimentation, a person of ordinary skill in the art can monitor the desorption conditions and adjust the inlet conditions of the desorption bed 120 as necessary. The inlet temperature is set by the heater 112. Generally, the desorption temperature is higher than the adsorption temperature and above about 66° C. (150° F.). The desorption temperature is usually from about 260° C. (500° F.) to about 538° C. (1000° F.). The inlet gas hourly space velocity is set by the compressor 106, and the inlet oxygen concentration is set by the air addition via line 102. The inlet molar ratio of water to halogen is preferably extremely high (i.e., little or no halogen in the inlet gas) since any halogen in the inlet gas to desorption bed 120 would deter desorption. Such low halogen concentrations are achieved by scrubbing the inlet gas with aqueous caustic solution, as shown in the drawing.

In this first embodiment, with the bed 120 in desorption mode, the outlet conditions of desorption bed 120 will change over time and no longer be the same, or substantially the same, as the desired inlet conditions of off-stream reactor 64. This might happen because the adsorbent in desorption bed 120 has become depleted of halogen, resulting in a gradual and ultimately unacceptable increase in the molar ratio of water to halogen in the desorption outlet gas. When this occurs in this first embodiment, the positions of desorption bed 120 and adsorption bed 80 are switched, so that desorption bed 120 is used for adsorption, and adsorption bed 80 is used for desorption.

The duration of time that a bed of adsorbent is in desorption mode and the frequency at which the bed is switched from desorption mode depends on many factors. In this first embodiment, and in all other embodiments of this invention as well, these factors include the desorption conditions, the type and amount of adsorbent, the type of halogen-containing materials, the residual or minimum capacity of the adsorbent for halogen at desorption conditions, the halogen content of the adsorbent, the molar ratio of water to halogen in the stream entering the bed of adsorbent, and the halogen concentration in the effluent of the bed of adsorbent. The halogen content in the desorption effluent is usually at least 1 wt-%, and more commonly at least 10 wt-%, greater than the halogen concentration in the desorption inlet. If less halogen is desorbed from a bed of adsorbent, the bed is removed from desorption mode and replaced with another bed. In this first embodiment, it may be and usually is desirable to extend the time that a bed of adsorbent is in desorption mode while still maintaining the outlet conditions of the desorption bed the same, or substantially the same, as the desired inlet conditions of the off-stream reactor. One possible way of simultaneously achieving these two objectives is to add water (or a compound that forms water after being added, such as an alcohol) to the gases that enter the desorption bed 120. Water in the inlet gases to desorption bed 120 helps desorb halogen from the adsorbent, and this is beneficial when the halogen content of the desorption outlet gases declines as the desorption bed 120 becomes depleted of halogen. Although the point of water introduction to the process could be anywhere downstream of separator 94 and upstream of desorption bed 120, it is preferred to add water at a point where the process temperature is relatively high, such as through line 113 downstream of heater 112.

Another way of not only extending the time that a bed of adsorbent is in desorption mode but also maintaining desirable outlet conditions of the desorption bed is to use two beds containing adsorbent in a parallel flow arrangement for desorption. Initially, only one bed of adsorbent is being desorbed, and all of the desorption gases flow to that one bed. However, as that desorption bed becomes depleted of halogen, the halogen content in that bed's effluent declines. When the composition of the desorption effluent is no longer the same, or substantially the same, as the desired composition of the regeneration inlet, a second bed of adsorbent is placed in a parallel flow arrangement with the first bed, and some of the desorption gases are routed to the second bed. While both beds are being desorbed, the flow rate of the desorption gases to the two beds is split so that a greater portion of the desorption gases flows to the first, more-depleted bed and a smaller portion of the desorption gases flows to the second, less depleted bed. In this way, the increase in halogen contributed by desorption of the second bed makes up for the decline in halogen contribution from the first bed, so that the total amount of halogen to the off-stream reactor is constant. Accordingly, the first bed of adsorbent may remain in desorption mode for a longer period of time than it could have remained if it alone was used to achieve the desired inlet conditions of the off-stream reactor. When the first bed is sufficiently depleted of halogen, the second desorption bed functions as the first desorption bed, and a third desorption bed replaces and functions as the second desorption bed.

In this first embodiment, and also in all other embodiments of this invention, the adsorption conditions are selected in order to recover a target or desired fraction of the total amount of the halogen that exits the off-stream reactor 64 in line 66. In the embodiment shown in the drawing, that total amount of halogen is equal to the amount of halogen that enters the adsorption bed 80 in line 78, and the amount of halogen that is lost (i.e., not recovered) is the amount of halogen in the gas stream that exits the adsorption bed 80 in line 82 and is then neutralized. Since the flow rates and halogen concentrations of the streams entering and leaving the adsorption bed 80 may vary with time, halogen recovery is determined by time-averaging the amount of halogen entering and exiting the adsorption bed 80. Thus, the amount of halogen entering the adsorption bed 80 can be computed by measuring the flow rates and halogen concentrations of the inlet stream at specified times, plotting a curve representing the product of each flow-rate-concentration data pair versus time, and then integrating the area under the curve. The amount of halogen leaving the adsorption bed 80 can be computed in a similar way, and the halogen recovery is the quotient of the amount leaving divided by the amount entering, expressed as a percentage and subtracted from 100%. Halogen recovery is generally greater than about 80 wt-% and preferably greater than 90 wt-%.

The halogen recovery is determined by many factors. The molar ratio of water to halogen of the inlet gas to the adsorption bed 80 certainly affects the recovery, but this operating variable is not one that a person of ordinary skill in the art practicing this invention would typically control. This is because this ratio is essentially the same as that of the flue gas exiting the off-stream reactor 64, which in turn is determined in large part by the previously-mentioned inlet conditions to off-stream reactor 64 and by the regeneration reactions that take place in the off-stream reactor 64. Generally, as the molar ratio of water to halogen increases, halogen recovery decreases. The molar ratio of water to hydrogen halide in the stream entering the adsorbent bed being used for adsorption is usually more than about 5:1, and depending on the catalyst being regenerated in the reactor as well as other factors, this molar ratio could conceivably be as high as about 50:1 or 100:1.

A second factor affecting halogen recovery is the halogen content of the adsorbent at the start of the adsorption step. Generally, as the initial halogen content increases, the halogen recovery decreases. This initial halogen content is the same as the final halogen content of the adsorbent used for desorption, since the bed of adsorbent that is used for adsorption had previously been used for desorption. For this reason, the extent to which halogen is desorbed during the desorption step can influence the halogen recovery in the adsorption step. But, for the same reason, this variable cannot be independently controlled once the desorption step is finished and the adsorption step begins.

A third variable that can be independently adjusted to affect halogen recovery during adsorption is the adsorption temperature. Adsorption temperature can be controlled by regulating exchangers 72 and 74. Generally, recovery increases as adsorption temperature decreases. Thus, if during adsorption, the halogen recovery drops below the desired target, the adsorption temperature may be decreased to the low end of the range of adsorption temperatures.

The operating temperature for adsorption mode is generally lower than that for desorption mode. The adsorption temperature is usually above about 66° C. (150° F.). The adsorption temperature is usually no higher than the outlet temperature of the reactor that is undergoing regeneration, but usually it is lower than that by at least 55° C. (100° F.) due to heat exchange between the outlet of the off-stream reactor 64 and the inlet of the desorption bed 80. Only rarely, would the adsorption temperature exceed 482° C. (900° F.). The adsorption temperature is generally maintained above the dew point temperature of the flue gas in order to minimize the possibility of condensing corrosive acidic liquid in the adsorption equipment. Also, the adsorption temperature is preferably maintained above the capillary condensation temperature of the flue gas, which is the temperature at which condensation from the flue gas occurs in the capillaries of the adsorbent. The capillary condensation temperature is usually higher than the dew point temperature of the bulk flue gas.

The capillary condensation temperature depends on many factors, including not only the composition of the flue gas but also the chemical and physical properties of the adsorbent, such as the distribution of pore size and volume. When there are differences in the physical dimensions and chemical components of individual pores of the adsorbent, capillary condensation will occur over a range of temperatures. The greater the amount of capillary condensation during adsorption, the greater is the amount of water present on the adsorbent at the start of the desorbent step. To the extent that this greater amount of water is desorbed during the desorption step, the greater is the amount of water withdrawn from the reactor undergoing regeneration and returned or recycled to the reactor.

The capillary condensation temperature can be approximately determined from a graph of the weight of water adsorbed on the adsorbent as a function of adsorption temperature of the flue gas. As temperature is decreased from above the range of capillary condensation temperatures into the range of temperatures where capillary condensation occurs, the slope of the graph increases dramatically. While the change in slope may occur over a range of temperatures rather than at one particular temperature, the change is nevertheless apparent to a person of ordinary skill in the art. For example, if the upper end of the range of capillary condensation temperature is 149° C. (300° F.), the change in the weight of water adsorbed may be only about 1.5 wt-% as the temperature is decreased from about 427° C. (800° F.) to about 149° C. (300° F.), but may be about 4 wt-% as the temperature is further decreased from about 149° C. (300° F.) to about 121° C. (250° F.). In addition, a person of ordinary skill in the art can estimate the capillary condensation temperature by estimating the difference between the dew point temperature of the bulk flue gas and the capillary condensation temperature using well-known correlations and theoretical techniques that take into account the dimensions of the adsorbent's capillaries and other factors, and then adding that difference to the measured dew point temperature.

Despite decreasing the adsorption temperature to increase halogen recovery, halogen recovery may nevertheless be unacceptably low, because of frequent or excessive breakthrough of halogen into the outlet of the adsorption bed 80. In this case, other embodiments of this invention can be used to further improve halogen recovery. Instead of, or subsequent to, operating the desorption bed 120 so that the outlet conditions of desorption bed 120 are the same as, or substantially the same as, the desired inlet conditions of off-stream reactor 64, the desorption operating variables may be selected somewhat independently of the regeneration conditions. In these other embodiments of this invention, desorption operating conditions are selected with the objective of decreasing the final halogen content of the adsorbent at the end of the desorption step. This objective can be met in several ways. First, the desorption temperature can be increased to a temperature above the desired regeneration inlet temperature. Heater 112 can heat the gases entering desorption bed 120, and exchanger 136 can cool the exiting gases to the desired inlet temperature for off-stream reactor 64. Second, the desorption step can be prolonged beyond the point when the outlet molar ratio of water to halogen increases above the desired inlet molar ratio for regeneration. In that case, line 128 may be used to add halogen to the gases exiting desorption bed 120, thereby lowering the molar ratio to the desired range.

Even if halogen recovery is within the desired range, the outlet conditions of the desorption bed 120 may not be the same, or substantially the same, as the desired inlet conditions of the off-stream reactor 64. For example, the molar ratio of water to halogen in the gases flowing through line 122 may be lower than the desired molar ratio at the inlet of the off-stream reactor 64. This can happen if too much halogen is being desorbed too rapidly from the desorption bed 120, such as when desorption is starting on a bed of adsorbent that adsorbed an excessive amount of halogen or when the gas is flowing through the bed at an excessive rate. In these situations, a surge of halogen may be desorbed from the bed, resulting in an unacceptably low molar ratio of water to halogen in the gases flowing through line 122. In these circumstances, either or both of two other embodiments of this invention are useful. First, line 132 may be used to add water to the gases exiting desorption bed 120, thereby raising the molar ratio to the desired range. Second, valve 121 may be opened to bypass desorption gases around desorption bed 120, thereby decreasing the amount of halogen that is desorbed from the adsorbent in desorption bed 120 and effectively raising the molar ratio of the gases flowing through line 126 to the desired range. In either event, once the molar ratio of water to halogen in the gases flowing through line 122 increases to the desired range, the water addition or the desorption gas bypassing may be decreased or stopped.

When halogen breakthrough occurs in the effluent of the bed of adsorbent that is being used for adsorption, the bed is removed from adsorption mode, and is subsequently used for desorption. The duration of time that the bed is in adsorption mode and the frequency at which the bed is removed from adsorption mode depends on many factors. These factors include the adsorption conditions, the type and amount of adsorbent, the type of halogen-containing materials, the maximum capacity of the adsorbent for halogen at adsorption conditions, the halogen content of the adsorbent, the molar ratio of water to halogen in the stream entering the bed of adsorbent, and the halogen concentration in the adsorbent bed. A bed of adsorbent used in adsorption mode adsorbs usually at least 90 wt-%, and preferably at least 99 wt-%, of the halogen in the stream entering the bed of adsorbent. If less halogen than that is adsorbed by the bed of adsorbent, the bed is removed from adsorption mode and replaced with another bed.

Although the description of this invention has been mainly in terms of two beds of adsorbent, one in use for adsorption and the other in use for desorption, there may of course be more beds of adsorbent, and at any given time some of these other beds might be in use for adsorption, desorption, or neither. One or more beds of adsorbent may have already been used for adsorption and are awaiting desorption, while others have been used for desorption and are awaiting adsorption. Such additional adsorbent beds may be desirable for several reasons. First, one or more additional beds may be useful if there is a heating step between the adsorption and desorption steps, to preheat the relatively cool adsorbent after adsorption and prior to desorption. Also, additional beds may be used if there is a cooling step after desorption and prior to adsorption. Third, additional beds may be used if the adsorbent beds have a relatively small capacity for halogen relative to the amount of halogen that may be removed from the off-stream reactor bed 64. Fourth, additional beds could function as a "reservoir" for halogen that had been removed from the off-stream reactor but which had not yet been returned to the reactor. Such a situation may arise when the regeneration conditions do not require that halogen removed from the catalyst be returned immediately to the off-stream reactor.

A fifth reason that additional beds may be desirable is that the additional beds may be used to maximize halogen recovery. In one example, a bed that is being used for adsorption could be replaced with a fresh bed either long before any halogen breaks through at the outlet of the bed or well prior to when the halogen content of the adsorbent in the bed in adsorption mode has reached its maximum content. By not operating the adsorption bed to the point of maximum possible halogen loading, the full halogen capacity of the adsorbent may not be utilized, but since the risk of halogen breakthrough is minimized, halogen recovery is maximized. In another example, two beds containing adsorbent could be used in a series flow arrangement for a "lead-lag" adsorption operation. The first bed in the series, or the "lead" bed, could be used for adsorption up to or even after either halogen breaks through at the outlet of the "lead" bed, or the halogen content of the adsorbent in the "lead" bed has reached its maximum. The second bed in the series, or the "lag" bed, could adsorb any halogen that breaks through the "lead" bed. By operating the "lead" bed to the point of its maximum possible halogen loading, the full halogen capacity of the adsorbent in the "lead" bed is utilized while still maximizing halogen recovery. When halogen breakthrough has occurred in the outlet of the "lead" bed, the "lead" bed is removed from adsorption mode and replaced with the "lag" bed, and the "lag" bed is replaced with a bed that has been used for desorption.

As previously described, halogen recovery is affected by the difference between the halogen content of the adsorbent prior to adsorption (i.e., after desorption) and the halogen content of the adsorbent after adsorption (i.e., prior to desorption). Generally, the greater the difference in halogen contents, the greater is the halogen recovery. Suitable halogen recoveries are achieved when the difference between the halogen content of the adsorbent prior to adsorption (i.e., after desorption) and the halogen content of the adsorbent after adsorption (i.e., prior to desorption) is from about 0.2 to about 2.0 wt-% halogen, and preferably from about 0.5 to about 1.0 wt-% halogen, based on the weight of the adsorbent.

The difference in halogen contents of the adsorbent depends on many factors, including the flow rates and compositions of the gases flowing through the adsorption and desorption beds, the adsorbent, the quantities of adsorbent used for adsorption and desorption, and other adsorption and desorption conditions, especially the difference between the adsorption and desorption temperatures. As long as there is some difference in the adsorption and desorption temperatures, then some adsorption of halogen will generally occur. With all other conditions being the same, the greater the difference in adsorption and desorption temperatures, the greater is the recovery of halogen. This increased recovery is due to either an increase in halogen pickup during adsorption (due to a lower adsorption temperature) or an increase in halogen removal during desorption (due to a higher desorption temperature). The difference in the adsorption and desorption temperatures is usually more than about 55° C. (100° F.). The difference in halogen contents also depends on the molar ratios of water to halogen during adsorption and desorption. The ratio of the molar ratio of water to halogen during adsorption to the molar ratio of water to halogen during desorption is generally from about 0 to about 2.

The relationship between, on the one hand, halogen recovery and, on the other hand, the flow rates and halogen concentrations of the streams during adsorption and desorption and the amount of adsorbent used for adsorption and desorption is that of a halogen material balance. Thus, assuming that the adsorbent in the adsorption bed has adequate capacity to adsorb a desired amount of halogen, it is possible to adsorb that amount either by using a relatively high flow rate of the gas at a relatively low inlet concentration of halogen or by using a relatively low flow rate of the gas at a relatively high concentration of halogen. Similarly, a desired amount of halogen can be desorbed from the desorption bed with either a relatively high or low flow rate of gas or with a relatively low or high concentration of halogen.

As used herein, the term "halogen" includes "halogen" or "halide." Thus, the term "halogen" includes an IUPAC Group 17 (VII B) element component such as fluorine, fluoride, chlorine, chloride, bromine, bromide, iodine, iodide, etc. The term "halogen-containing material" includes molecules or compounds containing halogen, regardless whether they are present on the catalyst, on the adsorbent, or in a fluid stream. But, in the case of molecules or compounds present on the catalyst or the adsorbent, the term "halogen-containing material" means the halogen or halide itself, rather than the catalyst or the adsorbent. That is, even when a catalyst or an adsorbent contains halogen, referring to the "halogen-containing material" on the catalyst or adsorbent does not refer to the catalyst or the adsorbent itself as a whole, but rather to the halogen or halide present on the catalyst or adsorbent.

All references herein to groups of elements are to the Periodic Table of the Elements, "CRC Handbook of Chemistry and Physics," CRC Press, $80^{th}$ Edition, 1999–2000.

We claim:

1. A process for the regeneration of a hydrocarbon conversion catalyst in the presence of a halogen-containing material, the process comprising:
   (a) contacting a regeneration inlet stream comprising a first component selected from the group consisting of oxygen, hydrogen, nitrogen, and a $C_1$–$C_5$ hydrocarbon with a catalyst in the presence of a halogen-containing material at regeneration conditions to at least partially regenerate said catalyst and produce a regeneration effluent stream comprising said material and said first component;
   (b) contacting at least a portion of said regeneration effluent stream with an adsorbent, adsorbing said material on said adsorbent at adsorption conditions, and recovering an adsorption effluent stream comprising said first component and having a reduced concentration of said material relative to said at least a portion of said regeneration effluent stream;
   (c) contacting a desorption inlet stream comprising a second component selected from the group consisting of oxygen, hydrogen, nitrogen, and a $C_1$–$C_5$ hydrocarbon with said adsorbent, said adsorbent having said material adsorbed thereon, desorbing said material from said adsorbent at desorption conditions, and recovering a desorption effluent stream comprising said material and said second component; and
   (d) forming said regeneration inlet stream from at least a portion of said desorption effluent stream.

2. The process of claim 1 wherein said adsorbent is selected from the group consisting of a molecular sieve, silica gel, carbon, and alumina.

3. The process of claim 1 wherein said catalyst is selected from the group consisting of a reforming catalyst, an isomerization catalyst, and a dehydrogenation catalyst.

4. The process of claim 1 wherein said regeneration is selected from the group consisting of burning carbon deposits on said catalyst, oxidizing a metal on said catalyst, drying said catalyst, and reducing a metal on said catalyst.

5. The process of claim 1 further characterized in that at least 80 percent of said material in said regeneration effluent stream is adsorbed on said adsorbent.

6. The process of claim 1 further characterized in that at least about 90 percent of said material in said regeneration effluent stream is adsorbed on said adsorbent.

7. The process of claim 1 further characterized in that said adsorption conditions comprise a temperature of less than about 482° C. and a molar ratio of water to halogen of more than 5:1.

8. The process of claim 1 further characterized in that said adsorbent has a capillary condensation temperature at said adsorption conditions, and said adsorption conditions comprise a temperature of greater than said capillary condensation temperature.

9. The process of claim 1 wherein said halogen is chlorine or fluorine.

10. The process of claim 1 wherein said material is selected from the group consisting of hydrogen chloride and molecular chlorine.

11. The process of claim 1 further characterized in that said adsorbent has a pre-adsorption halogen content prior to said contacting and said adsorbing in (b), said adsorbent has a post-adsorption halogen content after said contacting and said desorbing in (c), and the difference between said pre-adsorption halogen content and said post-adsorption halogen content is from about 0.2 to about 2.0 wt-% halogen, based on the weight of the adsorbent.

12. The process of claim 1 further characterized in that said regeneration inlet stream has a regeneration inlet temperature and a regeneration inlet molar ratio of water to halogen, said desorption effluent stream has a desorption effluent temperature and a desorption effluent molar ratio of water to halogen, the difference between said regeneration inlet temperature and said desorption effluent temperature is less than about 20° C., and the difference between said regeneration inlet molar ratio and said desorption effluent molar ratio is less than about 5:1.

13. The process of claim 1 further characterized in that the adsorption conditions comprise an adsorption temperature and an adsorption molar ratio of water to halogen, the desorption conditions comprise a desorption temperature and a desorption molar ratio of water to halogen, the difference between the desorption temperature and the adsorption temperature is more than about 55° C., and the ratio of the adsorption molar ratio to the desorption molar ratio is from about 0 to about 2.

14. The process of claim 1 further characterized in that a component consisting of at least one of water and a compound that can react to form water is introduced into said process and said water contacts said adsorbent in (c).

15. The process of claim 1 further characterized in that at least one of said at least a portion of the desorption effluent stream and the regeneration inlet stream is cooled.

16. A sorptive method for recovering a chlorine-containing material from the outlet stream of a cyclic regeneration operation of a hydrocarbon conversion process using a hydrocarbon conversion catalyst, said method comprising:
   (a) passing hydrocarbons to a first catalyst bed containing a hydrocarbon conversion catalyst and converting said hydrocarbons;
   (b) passing a regeneration inlet stream comprising a first component selected from the group consisting of oxygen, hydrogen, nitrogen, and a $C_1$–$C_5$ hydrocarbon to a second catalyst bed containing said hydrocarbon conversion catalyst, at least partially regenerating said hydrocarbon conversion catalyst in said second catalyst bed at regeneration conditions and in the presence of a chlorine-containing material, and recovering from the second catalyst bed a regeneration effluent stream comprising said material and said first component;
   (c) passing at least a portion of said regeneration effluent stream to an adsorption zone containing an adsorbent, adsorbing said material on said adsorbent at adsorption conditions, and recovering an adsorption effluent stream comprising said first component and having a reduced concentration of said material relative to said regeneration effluent stream;

(d) passing a desorption inlet stream comprising a second component selected from the group consisting of oxygen, hydrogen, nitrogen, and a $C_1$–$C_5$ hydrocarbon to a desorption zone containing said adsorbent, said adsorbent in said desorption zone having said material adsorbed thereon, desorbing said material from said adsorbent in said desorption zone, and recovering a desorption effluent stream comprising said material and said second component;

(e) forming said regeneration inlet stream from at least a portion of the desorption effluent stream; and (f) at least periodically shifting the functions of said adsorption and desorption zones by operating said adsorption zone to function as said desorption zone in (d), and operating said desorption zone to function as said adsorption zone in (c).

17. The process of claim 16 further characterized in that the functions of said first and second catalyst beds are at least periodically shifted by operating said first catalyst bed to function as said second catalyst bed in (b), and operating said second catalyst to function as said first catalyst bed in (a).

18. The process of claim 16 further characterized in that said adsorption effluent stream comprises said material, at least a portion of said adsorption effluent stream is contacted with an aqueous solution to remove said material from said at least a portion of said adsorption effluent stream and to form a recycle stream comprising said first component, and said desorption inlet stream is formed from at least a portion of said recycle stream.

19. The process of claim 18 wherein said first component is said second component.

20. The process of claim 16 wherein said hydrocarbon conversion process is a process selected from the group consisting of reforming, isomerization, and dehydrogenation.

21. The process of claim 16 wherein said regeneration is selected from the group consisting of burning carbon deposits on said catalyst, oxidizing a metal on said catalyst, drying said catalyst, and reducing a metal on said catalyst.

22. The process of claim 16 further characterized in that at least about 80 percent of said material in said regeneration effluent stream is adsorbed on said adsorbent.

* * * * *